United States Patent [19]

Gollub

[11] Patent Number: 4,476,066
[45] Date of Patent: Oct. 9, 1984

[54] JOINT ASSEMBLY FOR CASING CELLS

[75] Inventor: Klaus Gollub, Hamburg, Fed. Rep. of Germany

[73] Assignee: Bergham Export GmbH, Hamburg, Fed. Rep. of Germany

[21] Appl. No.: 405,715

[22] Filed: Aug. 6, 1982

[30] Foreign Application Priority Data

Aug. 8, 1981 [DE] Fed. Rep. of Germany ....... 3131519

[51] Int. Cl.$^3$ .............................................. B01F 3/04
[52] U.S. Cl. ..................................... 261/29; 62/310;
62/314; 220/77; 261/DIG. 3; 261/DIG. 41;
312/31.04; 312/31.1; 403/382; 403/402
[58] Field of Search .................. 261/24, 29, 36 R, 91,
261/92, DIG. 3, DIG. 4, DIG. 15, DIG. 41;
312/31.01, 31.03, 31.04–31.06, 31.1–31.3;
403/294, 375, 381, 382, 401, 402; 220/62, 76,
77; 62/310, 314, 315

[56] References Cited

U.S. PATENT DOCUMENTS

| | | | |
|---|---|---|---|
| 2,225,740 | 12/1940 | Feinberg | 261/24 |
| 4,029,723 | 6/1977 | Morrison et al. | 261/29 |
| 4,099,887 | 7/1978 | Mackenroth | 403/381 X |
| 4,240,765 | 12/1980 | Offterdinger | 403/402 |
| 4,309,365 | 1/1982 | Van Ness et al. | 261/DIG. 41 |

FOREIGN PATENT DOCUMENTS

| | | | |
|---|---|---|---|
| 217174 | 2/1961 | Austria . | |
| 647691 | 8/1962 | Canada | 403/402 |
| 7118181 | 5/1971 | Fed. Rep. of Germany . | |
| 7331520 | 8/1973 | Fed. Rep. of Germany . | |
| 2426722 | 12/1975 | Fed. Rep. of Germany . | |
| 2719434 | 11/1978 | Fed. Rep. of Germany | 403/402 |
| 1038317 | 8/1966 | United Kingdom . | |

*Primary Examiner*—Richard L. Chiesa
*Attorney, Agent, or Firm*—Thomas E. Beall, Jr.

[57] ABSTRACT

A joint assembly for a casing cell or the like, which may form the housing of an air-conditioning appliance serves to attach a plurality of wall members to respective adjacent wall members by means of joining elements of the tongue and groove type for enabling a detachable fitting, the adjacent wall members abutting with abutting faces inclined to the main surface of each wall member, wherein the tongue type elements positively engage the groove type elements provided in at least one of the abutting faces and defining an undercut edge for the tongue elements, and two of the wall members of the casing cell which are arranged opposite and rigidly connected to each other and receive the other moveable wall members by insertion in a rectilinear direction essentially perpendicular to an opening face defined between the rigidly connected wall members, at least one of the joining elements being resiliently deformable.

17 Claims, 12 Drawing Figures

JOINT ASSEMBLY FOR CASING CELLS

BACKGROUND OF THE INVENTION

1. Field of the Invention

The invention concerns a joint assembly for wall members of casing cells, box-shaped apparatus housings, cable shafts or similar casings, the wall members being adapted to accommodate with adjacent ones and fixed preferably detachably to each other, defining at least one main wall surface and at least two abutting faces inclined at an angle to the main wall surface, and fitted with each other by means of joining elements of the groove and tongue type, each of the abutting faces abutting against a complementary abutting face of the respective adjacent wall member to define a joint gap therebetween, which joint gap is penetrated by the tongue-type one of the joining elements whereas a groove type element is provided with a protruding edge undercut in an opening direction of the respective wall members and the tongue-type element is fixedly arranged on the adjacent wall member to receive the groove type element in a snugly fitting manner. The invention also concerns the use of such joint assemblies for box-shaped casing cells to be used for an air-conditioning apparatus comprising a refillable and float controlled water reservoir, an air-humidifying system associated to the reservoir via hoses and arranged in several of the wall members of the casing cell especially in the form of a water absorbing cushion, a motor-driven ventilator for ejecting the moistened cool air, and an exit opening provided in one of the side wall members.

2. Description of Prior Art

Today it is still often usual, when assembling appliance casings, to fit the single wall members to each other by screwing or otherwise to join them by soldering, riveting or the like. On the one hand, such manufacture is expensive and many separate parts have to be provided, while, on the other, the opening of the housing in the case of e.g. repairs or adjustments has to be carried out by means of special tools and necessitates a relatively large amount of work apart from the fact that small fastening elements such as screws can easily be lost. Apart from these positive or non-positive joints of course, also purely positive arrangements are known where the single wall members engage each other in a sliding seat.

However, in the building of appliances in general, and especially in the relevant fields of use, e.g. in the manufacture of air-conditioning and heat appliances as well as the manufacture of measuring instruments one has now turned to clamp joints in the form of resilient catches which engage in some undercuts correspondingly arranged in a fixed part of the appliance. The arrangement of such resilient members producing a positive and non-positive joint is, as a rule, very costly. It mostly concerns some projecting parts which either, in the case of cast or ejection moulded elements, must be formed integral in a special mould or which, in the case of metal casings, must be formed out of the wall surface by punching or bending. Besides, such tongue-shaped joint elements break off easily. At least they lose shape quickly if used a lot so that the locking pressure is often considerably affected after a few opening and shutting procedures. A further disadvantage of such clamp-locking joints is that they are usually only arranged and work punctiform which therefore leads to a varying stress on the edges of the locking wall member and leads to leaks, which is rather disadvantageous as a certain sealing effect must be achieved.

Special difficulties have been found in the construction of joints of wall members in air-conditioning appliances which are used to cool the air particularly in countries with low air humidity. Such appliances are internationally known under the name "Air Cooler" and are usually built in the form of a parallelepiped or a cube. An upper and a lower wall member, i.e. a floor and a cover, are fixedly connected to one of the side wall elements in these air coolers. The floor carries the water reservoir with a water pump and a float valve while the cover merely has a locking function and carries the water distribution pipes, whereas there is a large exit opening for the cold air arranged in the fixed side wall member which carries a radial ventilator.

There are four corner beams which are screwed, welded or riveted to the three fixed elements. The technical effort for mounting and fixing such casings, which mostly comprise wall members of galvanized sheet steel, is very large since expensive special machines and specialists are needed as well as a great amount of time. Three detachable wall members are arranged on this basic building unit which incorporate wood-wool or excelsior cushions in correspondingly designed frames. The actual humidifying of the air occurs via these excelsior cushions in which the water is finely distributed. The moveable side wall parts can be inserted in the fixed building unit.

OBJECTS OF THE INVENTION

It is a primary object of the invention to obtain in a general way a simplified and at the same time more effective construction of hingeless joints for wall members of casings, housings or the like in order to improve the construction and handling of the appliances resp. apparatus which can be used in the most different fields.

It is another object of the invention to achieve an advantageous possibility for a positive joining of wall members of casings, covers of cable ducts and other parts in civil engineering, in the manufacture of appliances or the like.

It is yet another object of the invention to provide a joint assembly which is easy to mount, clearly arranged and stable.

According to still another object of the invention such a joint should be easy to handle and enable a quick opening of the casing without any particular separate locking or other closing element having to be removed.

BRIEF SUMMARY OF THE INVENTION

According to the present invention these objects are achieved by a joint assembly comprising a plurality of wall members each adapted to accommodate with adjacent wall members, and joining elements of the groove and tongue type for detachably fitting or joining the wall members in a defined opening direction, each of the wall members defining at least one main surface and at least two abutting faces inclined at an angle to the main surface, each one of the abutting faces abutting against a complementary abutting face of the respective adjacent wall member to define a joint gap therebetween, which joint gap is penetrated by the tongue type one of the joining elements whereas the groove type element is provided with a protruding edge undercut in the opening direction and the tongue type element is fixedly arranged on the respective adjacent wall member to be received in the groove type element in a snugly fitting manner, wherein two of the wall members arranged opposite each other are rigidly connected to each other, the detachable joint is provided between such rigidly connected wall members and the wall members detachably connectable therewith, the opening direction is essentially rectilinear and essentially perpendicular to an opening face defined between the rigidly connected wall members, and one of the undercut edge and the tongue type element is resiliently deformable.

Preferably the abutting faces may be arranged in a mitred manner.

Such joints can be manufactured cheaply on wall members for appliances for differing purposes since they can be produced in one operation in the case of e.g. deep-drawn or injection moulded elements. Only the tongue elements are in the form of spare or single parts, which, in the course of a pre-assembly, can be inserted into one of the two wall members to be attached to each other and can be attached thereto if the tongue element is not designed as one piece with a wall member anyway. In this case, the final assembly only consists of the pieces to be fixed to each other being pressed into each other, the tongue element snapping into place into the opposite groove behind the undercut and forming an effective positive joint. The joint itself is primarily derived from the positive engagement, while the force needed for the snapping into place does not serve to maintain the joint, but merely the reaching of the positive fit.

Naturally, a combination of the positive fit with non-positive engagement is possible if necessary, the degree of which non-positive engagement is dependent on the one hand on the type, design and size of the groove and tongue fit and on the other or the elasticity of the material used. Depending on the size of the undercut undetachable or very easily detachable joints can be manufactured. The firmness of the joint also depends of course on the type of material used for the tongue element. The softer and more elastic it is the easier it is detach the joint.

The joint incorporating the invention can be used in the most differing of fields, namely in any field of application where pieces of certain planar extension have to be mounted preferably detachably on a basic body. The construction of exhibition halls and interiors, light-gauge construction and vehicle construction may be considered applicable fields for use as well as the manufacture of appliances. In this way, e.g. covers for cable shafts in houses can be cheaply manufactured.

If the joint assembly according to the invention is used in box-shaped casing cells then it is suggested that two wall members lying essentially opposite each other be rigidly attached to each other and that the joint assembly be designed between these on the one hand and further wall members fixed to these resp. between the latter. Thereby tab-shaped or otherwise positive joints formed by additional single pieces for such casing cells become unnecessary and the simple kind of design of the joint assembly enables an essential lowering of the cost in the series or mass production of wall members of such appliances.

According to another particularly preferred embodiment the joint according to the invention may be used for an air-conditioning appliance of which the casing cell forms the housing and which comprises a float controlled refillable water reservoir, an air-humidifying system including water absorbing cushions arranged in several of said wall elements of said casing cell and associated to said water reservoir via hoses, a motor-driven ventilator for conveying moistened cooling air, and an exit opening provided in one of said side wall members in which case it is suggested that the two wall members rigidly connected to one another be provided as the top and bottom wall members between which a plurality of connectors elements is provided and one of the side wall members be fixedly connected to the top and botton members and carry the exit opening, at least three further side wall members carrying the air-humidifying system being insertable, by means of the joint assembly, into the unit formed by the top and bottom wall members and the one side wall member, and that the ventilator be mounted on two transversal supports arranged between the connector elements. Such air-conditioning appliances can be manufactured more simply and cheaply due to the simplified structure of the joint, the structural elements being reduced in number at the same time and each taking over the function of several parts of known appliances. Subsequent shaping is not necessary. The number of structural elements which have to be despatched is relatively small due to the extensive pre-assembly, so that expenditure for packaging can be saved. The final assembly is basically simpler and can be carried out by semi-skilled staff.

The joint assembly can be manufactured in different ways, the type of design basically depending on what it is to be used for.

The tongue element can, e.g. be formed fixed to one of the two wall members to be connected to each other, i.e formed integrally with it, while the other wall member carries a groove into which the tongue element is pushed in order to snap into place. It is, of course, not important that the wall member be designed moveably with the tongue element. The groove could be equally well pushed over the tongue element, i.e. a relative movement between the two is necessary. In the case of such design it is appropriate that the tongue element have semi-circular cross-section and the opposite groove be correspondingly designed in the inclined or bevelled surface of the other part and have semi-circular cross-section as well. This kind of joint should especially be considered in cases where the wall members do not, or seldon need to be disassembled.

An embodiment of the invention has been proved especially appropriate in which the bevelled surfaces arranged opposite each other of both wall members are designed to have profile grooves for incorporating the tongue element, the profile grooves in both wall members being designed preferably mirror to the bevelled resp. separating level. The cross-section of the tongue element and thus of both profile grooves in their total profile can be preferably polygonal or circular. It is also possible for both profile grooves to be designed tangentially in one of their end sections as will be seen from the description of the function. The profile grooves can have the form of a circle, an oval or other curved shapes. The arrangement of the tangential end sections of the inner or outer side seen from the housing cell depends on the specific constructional circumstances and demands, e.g. taking the opening direction into account. If the wall member is detachable to the outside it may therefore be expedient to provide the tangential area to extend towards the inside.

The cross-section of the groove and tongue elements on the one hand is dependent on the technical circumstances. In this connection problems such as an easy substitution of the wall members, interchangeable construction—i.e. wall members of common shape which may be exchanged at will—and the use of simple prefabricated elements as tongue elements, e.g. round tension springs, circular cords of hard or soft foam rubber, rubber cords, O-rings, pipes or parts of pipes are of interest. A circular groove of a plastic cast or injection moulded part is generally more easily manufactured in a bevelled surface arranged at an angle of 45°. On the other hand the type and use of the joint plays a great part in deciding on the form of the groove and tongue. If a groove has semi-circular cross-section its upper edge creates a relatively small undercut if the other element is pushed in a direction of 45° to the separating resp. bevelled plane, this undercut being able to be overcome easily if the tongue element is only slightly elastic, while on the other hand such a relatively small undercut is sufficient to prevent an unwanted detaching of both positive joints. The oval shape design will generally be used if a strong positive engagement effect is to be achieved, while a tangential ending of the grooves can be advantageous in deep-drawn members, since these must have no undercuts with reference to their main processing direction.

As already mentioned, the tongue element can be quite elastic and consist of either solid material such as foam rubber, synthetic resin, caoutchouc or the like, or it can be a springy elastic hollow profile member which may be provided with a slot, if necessary. It is appropriate for the tongue element to be highly elastic or flexible if the joint is often to be detached and put back again, whereas a rigid tongue element can be used if the positive joint either does not need to be detached, or only very rarely. Tubular tongue elements with interrrupted or uninterrupted walls are preferably used where, apart from their economic insertability and availability, an inclusion of their inner space can be used for the appliance in question. The inner space of a pipe, for example, can be used as part of a canal system. The spring effect for the joining of the two wall members can be improved if the tongue element has a hollow cross-section with a slot.

With the help of the joint assembly according to the invention the casing cell can be designed preferably as a cube or parallelepiped, which basically depends on the constructive circumstances of the appliance. Naturally, arched outer surfaces should also be considered, and it is even possible to manufacture sphere-shaped casing cells using respecitvely shaped wall members.

It is also possible to design the wall members double-walled, so that they include a hollow space between their inner and outer walls. It is thus possible to manufacture wall, bottom and/or cover elements having high resistance to twisting and bending and also to save material and weight. According to a special embodiment the inner wall of the wall member can consist of deep-drawn heat-resistant plastic and the outer wall can consist of corrosion-resistant metal such as sheet aluminium or galvanized sheet steel. Naturally any other kinds of preferred materials can be used. It can be seen from the mentioned possible combination of materials how far the respective field of application is taken into account in respect of elasticity, stability, duration, etc. Also, very complicated pieces for the inner region of the wall member can be manufactured in one operation by using vacuum-shaped plastic deep-drawn pieces. In this connection special clamps for holding, e.g. excelsior cushions for the air humidifying in the case of the wall members being used for air-conditioning appliances, may become unnecessary if the inner region is shaped appropriately. The corrosion resistance as well as the avoidance of galvanic currents between the combinations of plastic and sheet aluminium or galvanized sheet steel as an outer part present special advantages with regard to duration also in extreme conditions e.g. in countries with much sun.

A summary of the advantages to be achieved by the invention reflects the following: the simplified design of the positive joint assembly leads to simpler construction possibilities for casing cells, cable shafts, separating walls to be fixed together, or the like, and at the same time leads to higher production and cheaper manufacture due to simpler production measures, the simple basic structure meaning that the members can carry out several functions. Better care of the surface and therefore a longer life of the appliances is achieved by the improved joint technique and less deformation of the single parts. The simple joint allows the complete pre-assembly of single casing pieces and therefore an easier final assembly of the casings whenever desired. The joint area can also take over other functions than its real function of joining the wall members. For example, in the case of the air-conditioning appliances the joint area can take part in the function of air-conditioning by incorporating the water distribution system, so that it has a double function as water distributor and edge joiner. It is also possible to locate the joining of upper and lower elements in this area, so that the strut elements lead through the grooves in the tongue element.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings

DETAILED DESCRIPTION OF THE PREFERRED EMBODIMENTS

Figure 1:
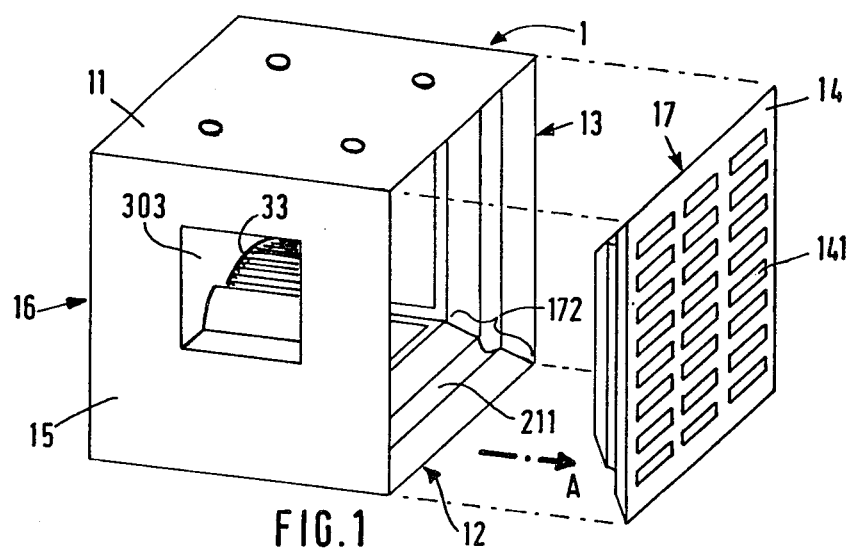
FIG. 1 is an axonometrical and partly exploded view of a cube-shaped casing cell for an air-conditioning resp. an air-humidifying device.
Figure 2:
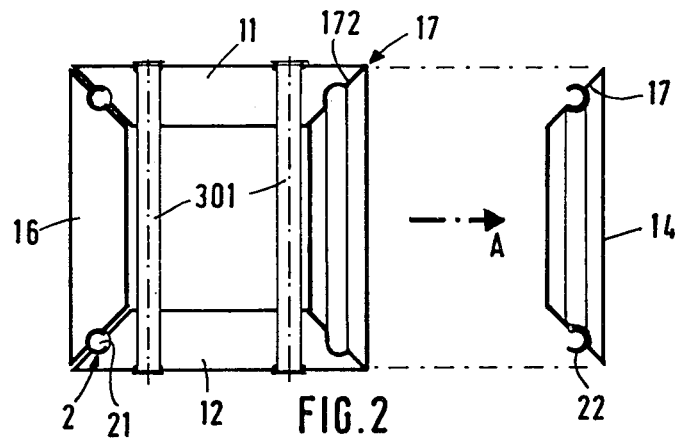
FIG. 2 is a vertical section through the casing of FIG. 1 on a smaller scale with a wall member shown exploded.
Figure 8:
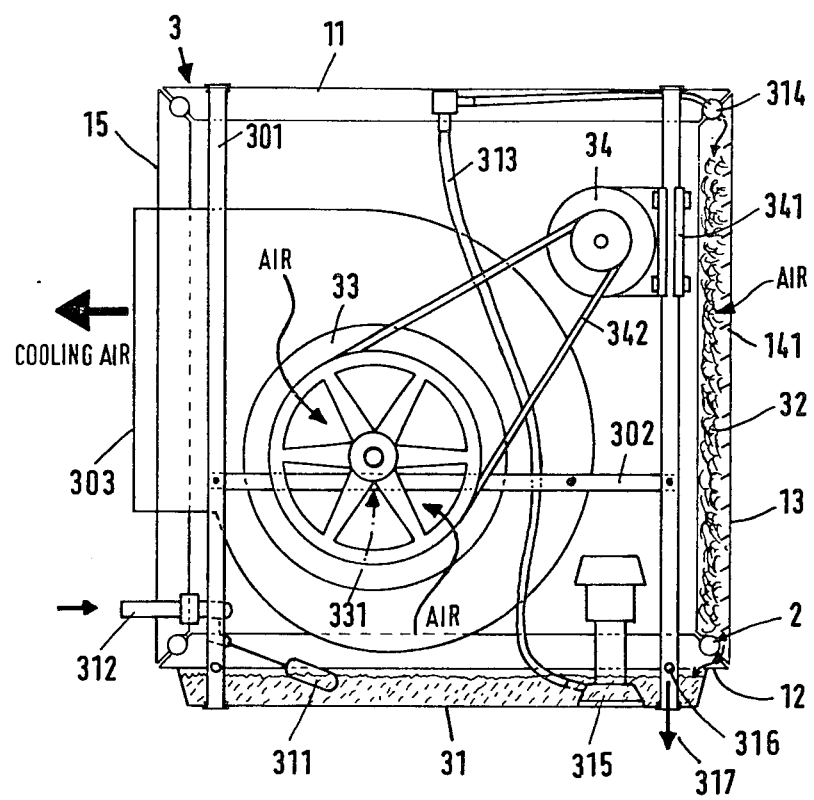
FIG. 8 shows a cross-section of an air-conditioning device and FIG. 9 is an enlarged view of a detailed structure of a wall member of the device shown in FIG. 8.

In FIGS. 1 and 2 there is shown a casing cell 1 which could be used e.g. for an air-conditioning appliance being shown in greater detail in FIG. 8. The casing cell 1 is formed by an upper wall member 11, a lower wall member 12 and side wall members 13-16 using a joint assembly 2 according to the invention. Sone of the constructive details of the air-conditioning appliance of FIG. 8 are already shown in FIGS. 1 and 2 for a better understanding. These will, however, be explained in connection with the specification for FIG. 8.

Upper wall member 11 and lower member 12 are rigidly connected to each other by means of four tubular joint struts or rods 301. Any other kind of joint could have been chosen, however. Additionally, the side wall member 15 carrying an air opening 303 is fixedly and inseparably connected to the structural unit formed from members 11 and 12. The other three side wall members 13, 14 and 16 are joined detachably with this structural unit by means of the joint assembly 2 according to the invention which works generally positively, these members being able to be extracted from resp. inserted into the structural unit 11, 12 and 15 corresponding to arrow A.

The principle of the joint 2 according to the invention can be taken most clearly from the enlarged detailed representations in FIGS. 3, 4c, 4d and 5. The wall members 12, 14 abut in a butt joint against each other with their edges 17, this abutment being created by the design of the edges 17 and bevelled or slanting surfaces 172. These bevelled surfaces 172 lie in the bisector of the joint angle of both wall members, this angle in the embodiment in FIG. 3 being a right angle so that the surface of inclination here lies at 45° to the outer surfaces of the wall members 12, 14. A profile groove 21 which receives a tongue element 22 is designed in the bevelled surface 172 which, at the same time, is the separating surface of both wall members. The profile groove 21 can have the shape of a circle (see FIG. 4d) or a partial circle with a tangential exit area (see FIGS. 3 and 4c) in cross-section, but other cross-sectional shapes such as oval, polygonal or the like shapes are possible. The profile groove 21 is formed of two partial grooves 211, 212 which are designed in both wall members 12, 14 in mirror symmetry to the bevelled surface 172. It is crucial for the safe fit of the joint 2 that the tongue element be arranged fixedly in one of the wall members which, in the present example, is the moveable wall member 14, while the fixed arrangement is shown e.g. in FIG. 3 by way of a rivet 23, and that the partial groove 211 has a protruding or projecting edge 214 in the fixed wall member 12, the projecting edge 214 creating an undercut for the tongue element 22 in relation to the direction of movement A. If the tongue element 22 consists of an elastic tube as in the examples in FIGS. 3, 4c, 4d and 5, then the lower part of the tongue element can be pressed over the projecting edge 214 when the wall member 14 is inserted, and the wall member 14 snaps into place in the structural unit 11, 12 as can be seen from FIG. 2. The positive fit is firm and can only be disengaged by the use of force e.g., by application of a lever in the outer edge area.

Instead of being in the form shown in FIGS. 3, 4c, 4d, and 5 the tongue element 22 can also consist of an elastic tube or solid material which is sufficiently elastic if one wishes to achieve a separable resp. detachable joint. On the other hand, it is possible, in order to provide such a detachable joint, to produce a relative elasticity by providing the tongue element secured to the moveable wall member 14, as seen in the examples in FIGS. 6 and 7, and arranging the groove in the form of a partial groove, only on the fixed wall member 12. In order to guarantee the snap engagement the wall member 12 must be manufactured of rigid material and the wall member 14 of flexible material, or the wall member 12 of flexible and the wall member 14 of rigid material. It can also be seen in these embodiments that the groove, with reference to the direction of movement of the wall member 14 and the tongue element forms projecting edges 214 creating an undercut.

On the other hand, a rigid inseparable joint construction between both wall members to be joined to each other can be achieved with the joint 2 of the invention. To this end, it is merely necessary that the profile groove 21 which receives the tongue element 22 be, quite in constrast to the groove shown in FIG. 2 which ends before reaching the outside and may thus be termed to be "closed", provided as a through-groove extending to the outer surface so that the tongue element 22 can be pushed into the wall members which come together by butt joint. The tongue element 22 will only show little or no elasticity in such cases so that the wall member 14 cannot be extracted in direction A from the wall member 12 resp. the unit determined by this wall member. In order to prevent a slipping out of the positioned tongue element in such cases it is of course possible, and in many cases advisable to provide some type of locking elements known to the man skilled in the art which enable a locking of the wall members in the desired position.

Figure 6:
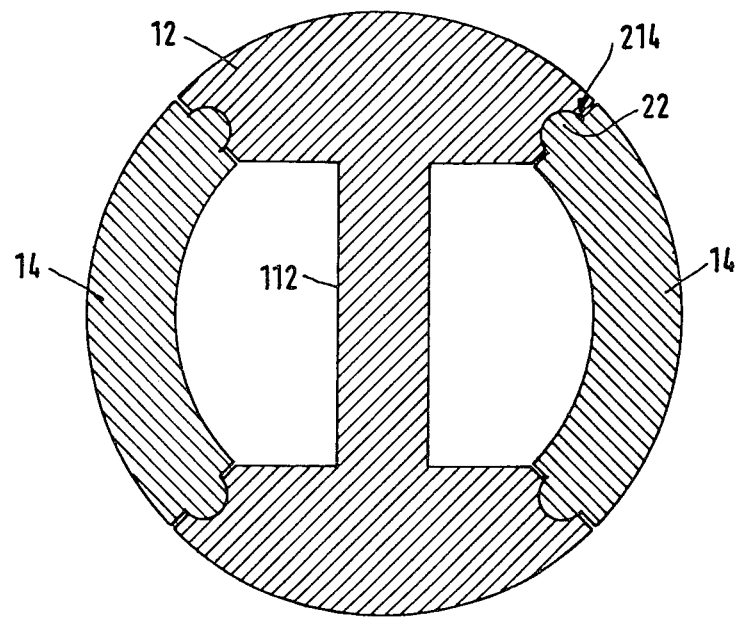
FIG. 6 shows another embodiment for a cylindrical casing cell.
Figure 7:
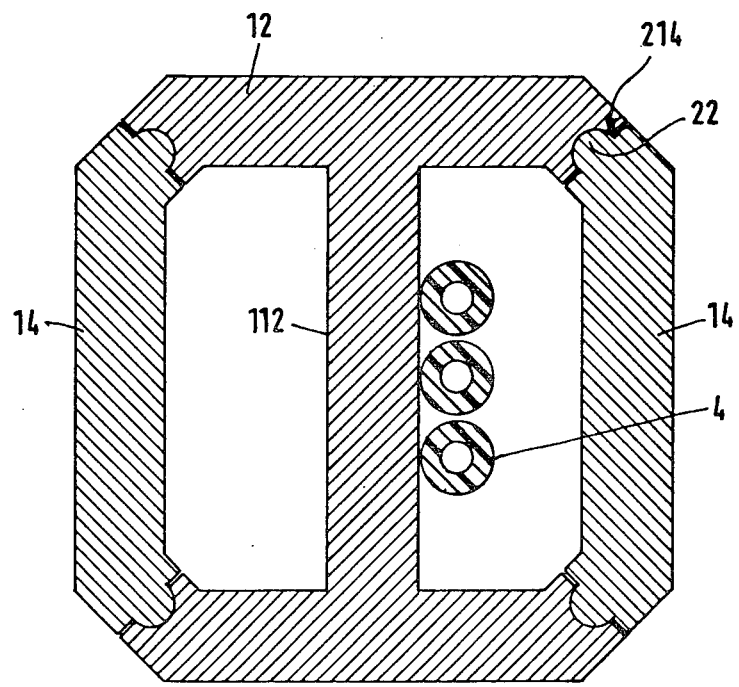
FIG. 7 shows another embodiment of the invention for a cable duct in cross-section.

While four tubular joint struts 301 are used in the casing cell of FIGS. 1, 2 and 8 for the manufacture of a rigid structured unit of upper and lower wall members, the struts being mounted fixedly by upsetting riveting or other appropriate joining technique on the wall members concerned, these wall members can, as can be seen from the embodiments of FIGS. 6 and 7, also be rigidly connected to each other by means of a web 112 and thus form the structured unit 12 receiving the movable wall members 14. It is important that these joint elements have the function of a kind of tension rod and take up the forces when the moveable wall parts 14 (or 13 resp. 16) clamp or are removed.

Figure 4A:
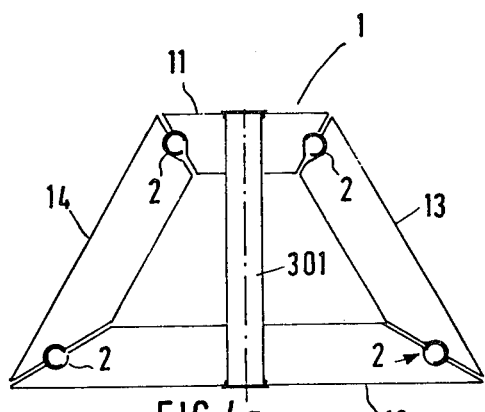
FIG. 4a is a cross-section of a trapezoid-shaped casing cell.
Figure 4B:
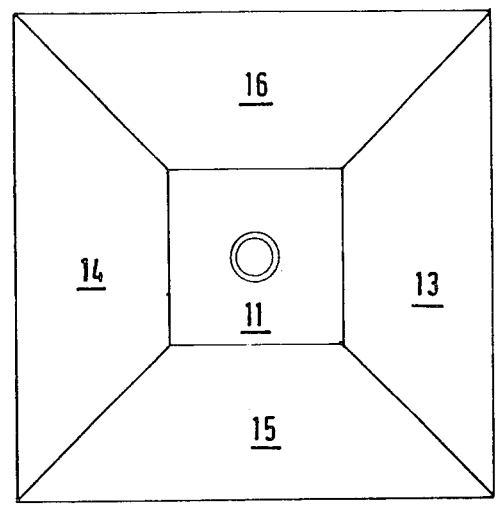
FIG. 4b is a plan view of the casing cell of FIG. 4a, FIG. 4c is an enlarged view of the cover joint of the casing cell of FIG. 4a, FIG. 4d is an enlarged view of a further structural embodiment for the joint for the floor part of the casing cell shown in FIG. 4a, FIG. 5 shows two embodiments of casing cells, namely of either polygonal or circular cross-section.

The structural parts constructed by using the joint 2 as can be seen from the various represented embodiments, can have the most varied geometrical shapes which cannot all be shown. Hexagons, octagons, or similar polygons, cylinders, spheres or the like can be manufactured as well as the shown cube (FIGS. 1, 2 and 8) or truncated pyramid (FIGS. 4a and b). The form of the casing cell only depends on the expendiency of the corresponding use as well as considerations of design.

FIGS. 6 and 7 show embodiments for e.g. lengthy cable shafts resp. elements for building the same, the embodiments showing great dimensions of length. FIG. 7 shows several cables 4 in the hollow space surrounded by the wall members 12 and 14. Both Figures also show the possibility of integrating the tongue element with one of the wall members, so that the groove is only found in the respective other, neighbouring wall member.

A cube- or square-shaped casing cell 1 is manufactured using the joint 2 according to the invention for an air-conditioning apparatus 3 shown in FIG. 8 which serves to moisten the air in dry rooms. As can be seen from the cross-sectional representation shown in FIG. 8 the joint 2 as well as the joint struts 301 will be integrated into the function of such a device in order to improve the manufacture and operation thereof in view of conventional appliances of this kind. Excelsior or wood-wool cushions 32 are arranged in the removeable side wall members 13, 14 and 16 serving to distribute the water in the appliance casing made from upper wall member 11, lower wall member 12 as well as four side wall members 13 to 16. In this casing the upper wall member 11 and the lower wall member 12 are connected rigidly to each other by means of four joint struts 301. The side wall member 15 carrying an opening 303 also using the joint 2 according to the invention is connected to the upper and lower members 11, 12. The struts 301 can, of course, also be included in the joint 2 region (not shown in the drawings) to obtain more room for other aggregates. There is a water reservoir 31 on the lower wall member 12 resp. beneath it into which reservoir water can flow via a valve 312 controlled by a float 311. This water is led from a pump 315 to a water distributor 314 in the upper wall member 11 via a pipe 313 and distributed here into the three wall members which carry the wood-wool cushions 32. The water distribution occurs partly in the grooves 21 which thereby form part of the water system. A ventilator 33 is to be found inside the appliance casing, the ventilator being mounted by means of bearings 331 on cross-members 302 arranged between each two of the joint struts 301. An electric motor 34, which is connected to the ventilator 33 by means of a V-belt 342 is mounted on a mounting plate (not shown in detail) which can be mounted fixedly by means of clamping on two of the joint struts 301 and can be adjusted in height. In this way the tension of the V-belt 342 can be easily adjusted. When the pump 315 and the ventilator 33 are operated air is sucked into the inside of the casing 3 through air holes 141 which are provided in the wall members 13, 14 and 16 via the excelsior cushions 32, the air being moistened by the water which is finely distributed in the excelsior cushions 32. The ventilator 33 pumps this moistened air through the air opening 303 in the side wall member 15 into the room to be air conditioned. It can be seen that the double functions of the joint 2 as joiner and as part of the water distribution as well as of the joint struts 301 as joiners of the upper and lower members 11, 12 and as supports for the electric motor 34 enable an essentially simplified construction of the air conditioning appliance.

Figure 3:
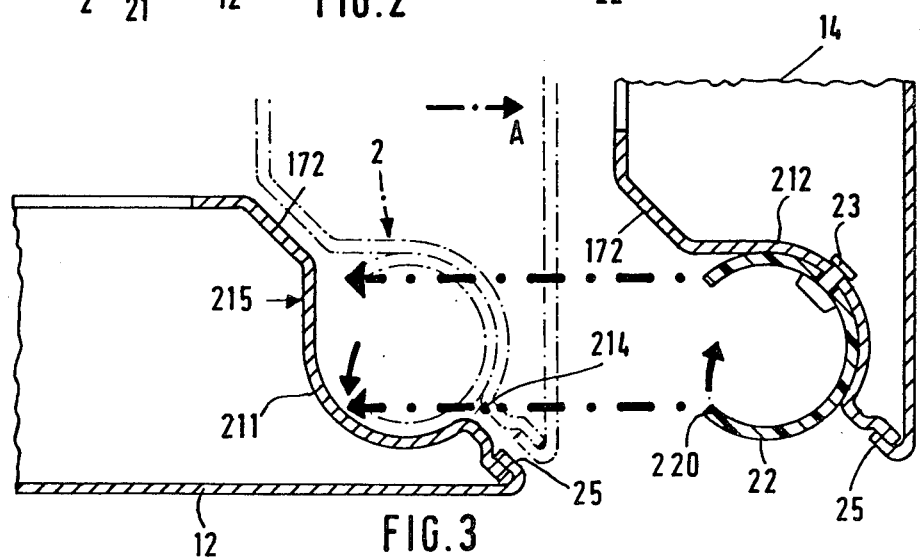
FIG. 3 is an enlarged view of a corner joint of the device.
Figure 4C:
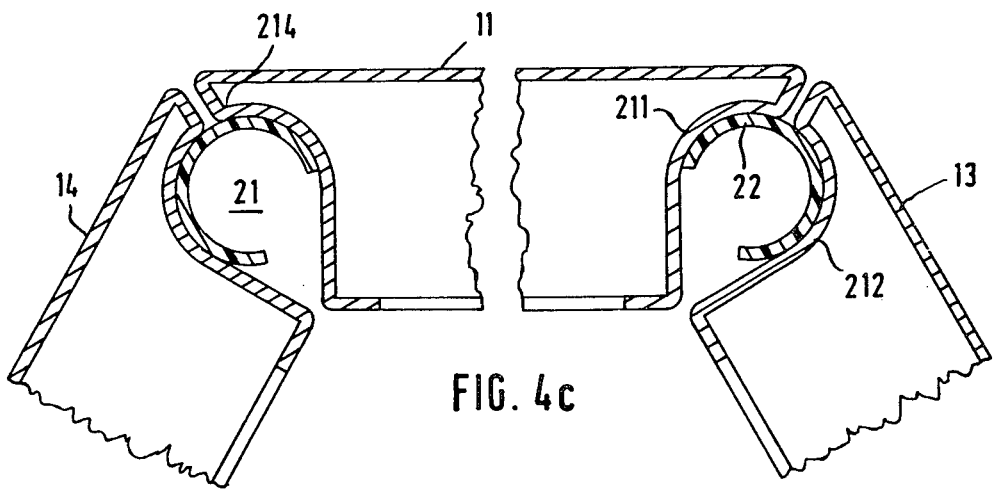
Figure 9:
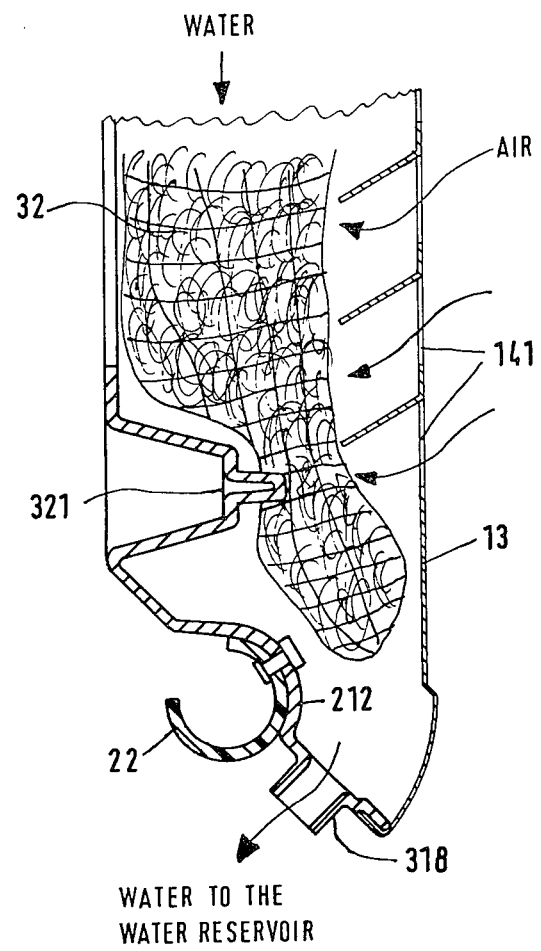

A further, special and preferred possibility of the construction of the wall members results from the joint 2 according to the invention, the members being able to be constructed double-walled as can be seen, e.g. from FIGS. 3, 4c and d as well as FIG. 9. A hollow chamber can thereby be formed in the wall members and on the one hand a greater rigidity against distortion as well as on the other room for the inclusion of e.g. excelsior cushions 32 in the case of the casing cell being used for air humidifiers can be achieved. The manufacture of the wall members is further simplified by the double walls, since the inner members can be formed as injection moulded or deep-drawn synthetic members while the outer members can consist of sheet metal such as aluminium plate or galvanized sheet steel. The joint of the inner and outer members is indicated in FIG. 3 by "25". It can be manufactured in any appropriate way, e.g. by adhesion or form locking. One can also see the inportance of the tangential areas 215 of the profile grooves 21 which lies in that when constructing the inner member as an injection moulded or press moulded piece the removability from the mould must be guaranteed and the member can have no undercut in regard to its direction of being removed form the mould. The same idea is contained by the construction of the wall members 11, 13, 14 shown in FIG. 4c. Due to the very "steep" position of the slanted surface the construction of the profile groove 21 as a circle would lead to an undercut which would make a removal form the mould impossible. This is different in the case of the relatively low inclination of the slanted surface in the embodiment of FIG. 4d which makes a circular cross-section of the profile groove 21 possible.

Figure 4D:
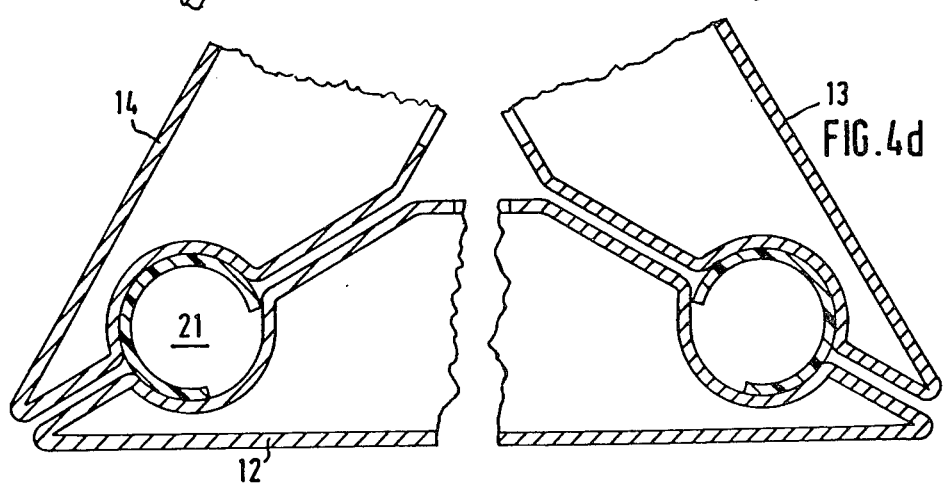
Figure 5:
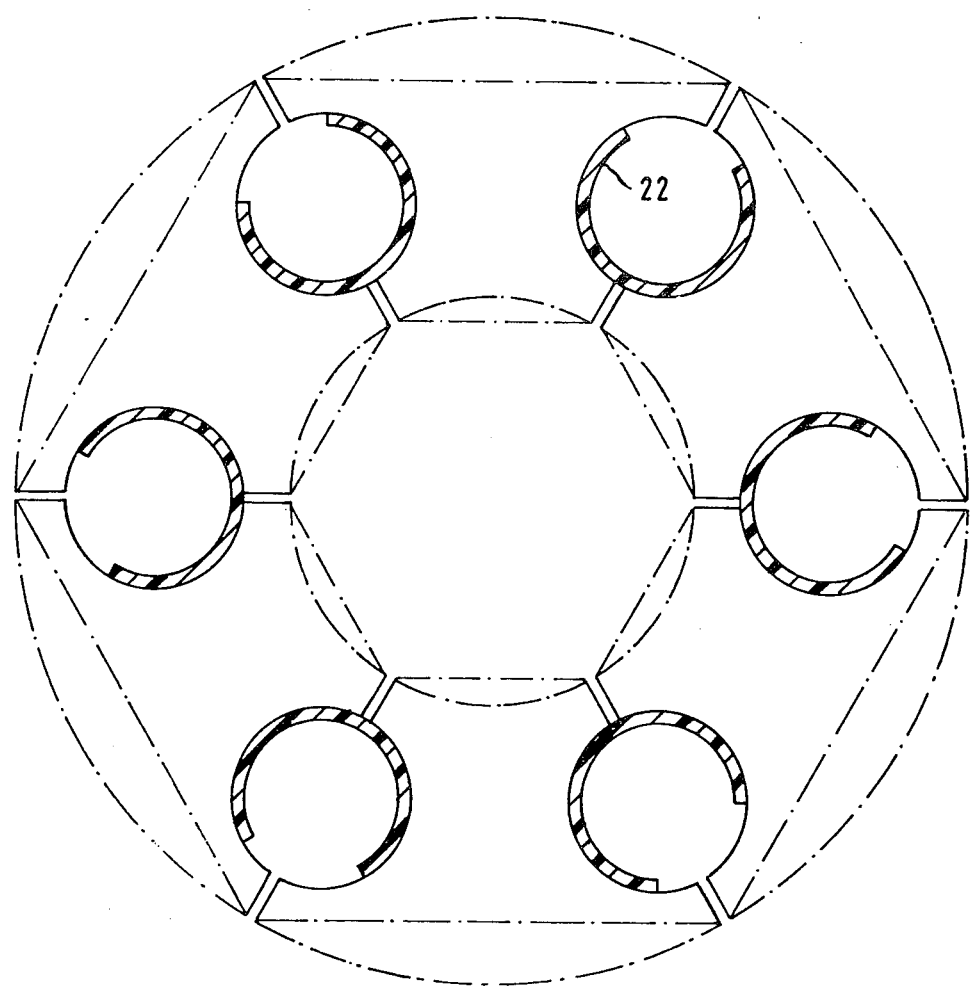

If slotted, i.e. tubular elements which are laterally slotted are used as the tongue element 22 according to the examples in FIGS. 3, 4c and 4d it is important to note that a free end 220 of the part of the tongue element which is to be pushed over the projecting edge 214 lies a bit higher than the projecting edge 214, as is indicated by the dotted line in FIG. 3. This is to prevent the free end 220 from jamming behind the projecting edge 214 when the wall member 14 is pushed in. The free end 220 should rather be able to be pushed easily over the projecting edge by bending of the free part of the tongue element 22 upwardly.

What is claimed is:

1. A joint assembly provided on casing cells, box-shaped housings, cable ducts or similar casings, comprising:
   at least two relatively fixed wall members essentially opposing each other and being rigidly interconnected to define an open face to be closed;
   a detachable wall member for closing said wall face by being moved generally rectilinearly along an opening direction perpendicular to said opening face;
   said detachable wall member and said fixed wall members, adjacent thereto, all being provided with abutting faces inclined at an angle to the opening face, with the abutting faces defining a joint gap therebetween, with said fixed wall members being on one side of said joint gap and said detachable wall member being on the other side of said fixed gap;
   joint means penetrating said joint gap and being of the tongue and groove type, said joint means having a tongue element extending along the abutting face on said one side of said joint gap and a profile groove extending along the abutting face on the other side of said joint gap and opening into said joint gap, said tongue element and profile groove being of complementary mating shapes;
   said profile groove, when seen in the opening direction of the detachable wall member, having a protruding edge forming an undercut and receiving the tongue element behind said protruding edge when said tongue element is inserted into said profile groove to form the joint assembly;

at least one of said profile groove and said tongue element being sufficiently resiliently deformable such that the joint assembly forms a snap joint;

said profile groove and tongue element being respectively fixedly attached to their wall members;

said joint means providing assembly and disassembly of said profile groove and said tongue element such that the detachable wall member is removable rectilinearly essentially in the opening direction perpendicular to the opening face that is closed by the detachable wall member and formed between the opposing fixed wall members, with the removing of the detachable wall member occurring by disconnecting the snap joint through resilient deformation of at least one of said profile groove and tongue element.

2. The joint assembly according to claim 1, wherein said profile groove has at least two portions opening in opposite directions along a line parallel to said opening face, so that the resiliently deformable one of said profile groove and tongue element correspondingly deforms in said opposite directions during assembly and disassembly of the snap joint.

3. The joint assembly according to claim 2, wherein each of said wall members is substantially planar, and wherein said abutting faces are generally planar and bisect the angle between the planar respective wall members.

4. The joint assembly according to claim 3, wherein there are at least three of said fixed wall members joined together to encircle said opening face and thereby defining a generally closed loop of said abutting faces, said profile groove and tongue element each extending entirely around the closed loop of said abutting faces.

5. A joint assembly as claimed in claim 1, wherein said abutting faces are arranged in a mitred manner.

6. A joint assembly as claimed in claim 1, wherein said wall member carrying said tongue-type element is provided along its inclined abutting face with a second profile groove designed with a cross-section corresponding to that of said profile groove and adapted to accommodate part of said tongue-type element in it.

7. A joint assembly as claimed in claim 6, wherein said profile grooves in both of said wall members are arranged in inverse relationship with respect to said joint gap.

8. A joint assembly as claimed in claim 7, wherein said profile grooves, taken together, and said tongue type element, respectively, have a polygonal cross-section.

9. A joint assembly as claimed in claim 7, wherein said profile grooves, taken together, and said tongue type element, respectively, have circular cross-section.

10. A joint assembly as claimed in claim 7, wherein both of said profile grooves are shaped tangentailly in one of their end sections.

11. A joint assembly as claimed in claim 7, wherein both of said profile grooves, taken together, are of oval shape.

12. A joint assembly as claimed in claim 1 or 6, wherein said tongue-type element is made from a solid profile material chosen from the material group including foam rubber, synthetic resin and caoutchouc.

13. A joint assembly as claimed in claim 1, wherein said tongue-type element is a resilient hollow profile member.

14. A joint assembly as claimed in claim 13, wherein the wall of said hollow profile member is provided with a slot.

15. A box-shaped casing cell including a joint assembly as claimed in claim 1, said wall member being arranged as at least one top and one bottom wall member and a plurality of side wall members therebetween, and said casing cell forming the housing of an air-conditioning device comprising a float controlled, refillable water reservoir, an air-humidifying system including water absorbing cushions arranged in several of said wall elements of said casing cell and associated to said water reservoir via hoses, a motor-driven ventilator for conveying moistened cooling air, and an exit opening provided in one of said side wall members, wherein said two wall members rigidly connected to one another are provided as sald top and bottom wall members forming a structural unit between which a plurality of connector elements is provided, and one of said side wall members is fixedly connected to said top and bottom members and carries said exit opening, at least three further of said side wall members carrying said air-humidifying system being insertable into said structural unit formed by said top and bottom wall members and said one side wall member by means of said joint assembly, and wherein said ventilator is mounted on two transversal supports arranged between said connector elements.

16. A casing cell as claimed in claim 15, wherein said wall members are of the double-wall type.

17. A casing cell as claimed in claim 16, wherein an inner wall of said double walled wall members is made of dish-shaped, heat-resistant synthetic material, whereas an outer wall of said double-wall type member is made of a corrosion-resistant metal.

* * * * *